(12) United States Patent
Negi et al.

(10) Patent No.: US 9,690,998 B2
(45) Date of Patent: Jun. 27, 2017

(54) FACIAL SPOOFING DETECTION IN IMAGE BASED BIOMETRICS

(71) Applicant: Intel Corporation, Santa Clara, CA (US)

(72) Inventors: Ansuya Negi, Beaverton, OR (US); David L. Graumann, Hillsboro, OR (US); Rahuldeva Ghosh, Portland, OR (US); Ranjit S. Narjala, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/779,842

(22) PCT Filed: Dec. 19, 2014

(86) PCT No.: PCT/US2014/071646
§ 371 (c)(1),
(2) Date: Sep. 24, 2015

(87) PCT Pub. No.: WO2016/076898
PCT Pub. Date: May 19, 2016

(65) Prior Publication Data
US 2016/0328621 A1    Nov. 10, 2016

Related U.S. Application Data

(60) Provisional application No. 62/079,020, filed on Nov. 13, 2014.

(51) Int. Cl.
*G06K 9/00* (2006.01)

(52) U.S. Cl.
CPC ..... *G06K 9/00899* (2013.01); *G06K 9/00221* (2013.01)

(58) Field of Classification Search
None
See application file for complete search history.

(56) References Cited

U.S. PATENT DOCUMENTS

| 2011/0188712 A1 | 8/2011 | Yoo et al. |
| 2012/0301020 A1 | 11/2012 | Tallamraju et al. |
| 2013/0188840 A1 | 7/2013 | Ma et al. |

FOREIGN PATENT DOCUMENTS

| EP | 2453383 A1 | 5/2012 |
| EP | 2590140 A1 | 5/2013 |

(Continued)

OTHER PUBLICATIONS

"International Application Serial No. PCT/US2014/071646, International Search Report mailed Jul. 29, 2015", 3 pgs.

(Continued)

*Primary Examiner* — Randolph I Chu
(74) *Attorney, Agent, or Firm* — Schwegman Lundberg & Woessner, P.A.

(57) ABSTRACT

Systems and techniques for facial spoofing detection in image based biometrics are described herein. A marker may be created for a representation of a face in a first plurality of images of a sequence of images. The marker corresponds to a facial feature of the face. An environmental feature of an environment of the face may be identified across a second plurality of images of the sequence of images. A correlation between the marker and the environmental feature in the sequence of images may be quantified to produce a synchronicity metric. A spoofing attempt may be indicated in response to the synchronicity metric meeting a threshold.

24 Claims, 7 Drawing Sheets

(56) References Cited

FOREIGN PATENT DOCUMENTS

| TW | 200906198 A | 2/2009 |
|---|---|---|
| TW | 201425524 A | 7/2014 |
| TW | 201617973 A | 5/2016 |
| WO | WO-2006009837 A2 | 1/2006 |
| WO | WO-2016076898 A1 | 5/2016 |

OTHER PUBLICATIONS

"International Application Serial No. PCT/US2014/071646, Written Opinion mailed Jul. 29, 2015", 8 pgs.

Kollreider, K, et al., "Non-intrusive liveness detection by face images", Image and Vision Computing 27(3), (2009), 233-244.

"Taiwanese Application Serial No. 104132539, Office Action mailed Mar. 1, 2017", w/ brief summary from agent's letter, 7 pgs.

FACIAL SPOOFING DETECTION IN IMAGE BASED BIOMETRICS

PRIORITY APPLICATION

This application is a U.S. National Stage Application under 35 U.S.C. 371 from International Application Number PCT/US2014/071646, filed Dec. 19, 2014, which claims the benefit of priority to U.S. Provisional Patent Application Ser. No. 62/079,020, filed Nov. 13, 2014, all of which are incorporated herein by reference in their entirety.

TECHNICAL FIELD

Embodiments described herein generally relate to biometric computer authentication and more specifically to facial spoofing detection in image based biometrics.

BACKGROUND

Facial recognition for authentication purposes allows a user to use her face to authenticate to a computer system. Generally, the user's face is captured and analyzed to produce and store a feature set to uniquely identify the user during a set-up process. When the user wishes to use their face in a future authentication attempt, a camera will capture a representation of the user's face and analyze it to determine whether it sufficiently matches the stored feature set. When a sufficient match between a current image capture of the user's face and the stored feature set is made, the user is authenticated to the computer system.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
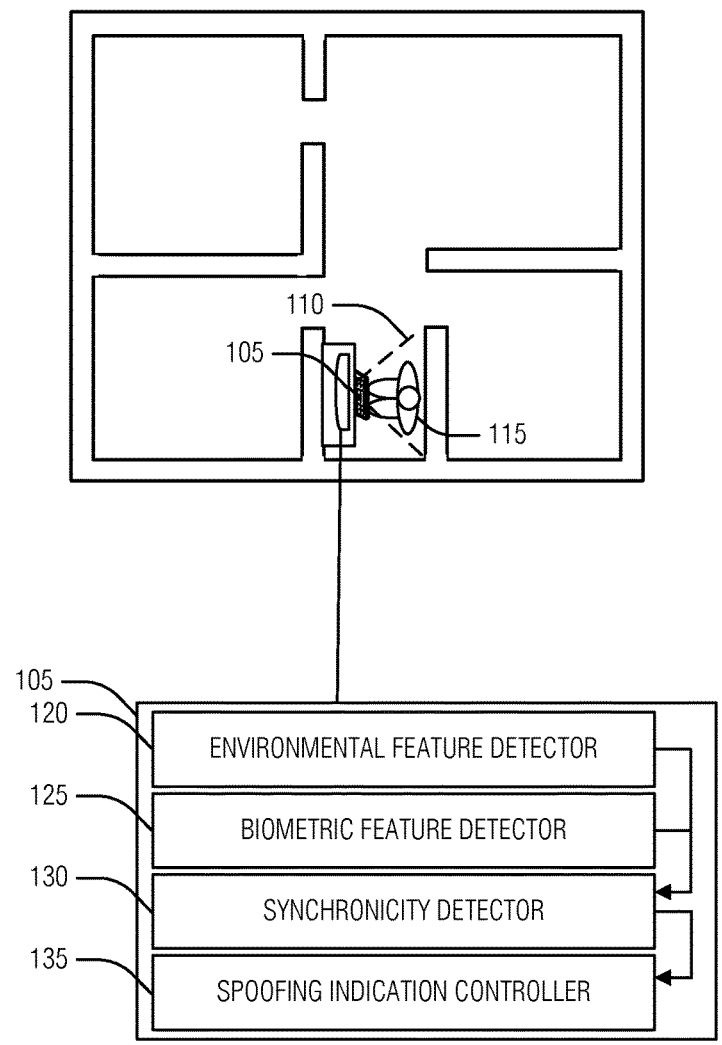
FIG. 1 is a block diagram of an example of system for facial spoofing detection in image based biometrics, according to an embodiment.

Some current facial recognition solutions are prone to be spoofed (e.g., faked) by a photo, for example, displayed on a phone, tablet, etc. For example, a person may acquire a picture of a user via a tablet camera or from an employee face-book, display that picture on a device, and hold the device in front of a camera being used to capture a facial representation to authenticate, thereby using the user's face without the user's permission. Thus, the person has spoofed the user's real face to circumvent the face-based authentication process.

To prevent facial spoofing, two types of anti-spoofing techniques may be employed (alone or in combination): 1) asking users to perform certain tasks (e.g., invoking dynamic user involvement that may be hard to predict to complicate spoofing); or 2) analyzing the context (e.g., environment) of the image capture to determine whether the captured image represents a "live" user. Both techniques may distinguish between a live user and a facsimile, but merely asking for more user input may present some user experience challenges (e.g., how to represent the quest, difficulty for user's to follow the request, excessive time in performing the requests, etc.). Analyzing the context in which the image was captured, however, may avoid the user experience challenges associated with a more interactive technique.

The described components and techniques provide facial spoofing protection without involving a challenge-response user action by analyzing the facial image capture context. For example, the context of image acquisition may include analyzing relative motion of a face and environmental features (e.g., the background) across a sequence of images. Thus, if the captured representation of the face includes movements that synchronize with background features (e.g., edges of a mobile device), it may be determined that the face is a spoof attempt. Further, tell-tale contours of known device edges (e.g., the body, screen, etc.) may be determined and further implicate spoofing when, for example, the face is bounded by the edges of a digital device.

An example of facial capture context may include one or more of the following features to perform facial spoofing detection in image based biometrics. Edges of a phone or tablet may be captured from a video frame. In an example, at least one of gain, exposure, or gamma are controlled (e.g., by a camera or other capture device) to make the edges more detectable (e.g., by increasing contrast). In an example, the video frame may be processed by a noise filter to reduce environmental noise (e.g., to make either edge detection or facial detection easier).

The captured edges may be checked to determine if they resemble the contours of a known digital device, for example, within a threshold. The video frame may be analyzed to determine whether the face is present in a frame of moving edges, including whether eyes are found for the face. For example, the eyes may be marked by a line connecting them both. A convex hull may be created for a set of corners of the moving edges. Take note when the eye marker is within the convex hull and thus probably within a device whose contours match the moving edges. The eye marker being within the convex hull confirms that both the eyes and the edges moved together as a face inside a phone or tablet. Thus, a spoofing attempt is being made.

If face is not included inside the moving frame, it could be a live user holding or using a phone (e.g., off to the side) for valid reasons (e.g., reasons other than making a spoofing attempt). However, edge movement may still be monitored to track device movement within the sequence of images. This may be beneficial when video quality is low and the edges may not be detectable in every frame. Thus, the position of the device edges may be inferred in a frame in which they are not detectable or positively detected, for example, by noting where they were last detected. In this scenario, a face appearing in an area that is within an inferred frame (e.g., because the edges aren't detected in the frame with the face) may still be called out as a spoofing attempt. As noted above, edges, or other features, that move together may be tracked to infer the position of moving entities from previous captured images to captured images where the entity cannot be found. Synchronized movement may be tracked with respect to any of rotational, scaling, or translational movement. In an example, capturing these moving features and inferring their position in captured images in which they do not appear is referred to as capturing partial moving features.

If a face is not detected, then a check as to whether all of the movements of the video frame (e.g., all of the detected edges) are synchronized is performed. Complete or nearly complete synchronized movement of the observable features from the video frame may indicate that the entire captured image is of a static representation (e.g., a picture). That is, the material in a picture, displayed on a tablet, etc., completely fills the camera's field of view.

Movement may be detected over a sequence of captured images. In an example, at least thirty captured images in sequence are used to determine either or both of facial or environmental feature movement. The spoofing indication criteria may include the following: 1) if a face is present and inside a detected device (e.g., edge contours of known device), then indicate spoofing unless, in an example, the eyes and device edges do not all move together; 2) If the face is present but not inside the device, then determine whether face movements synchronize with other environmental features—This may allow detection of background image features when, for example, the device is held too close to the camera to view the device edges—and indicate a spoofing attempt when the eyes and detectable moving edges all move together (e.g., within a threshold); 3) If the face is not present and at least two device edges move together, then tag as the two devices edges as partial moving edges and infer a boundary of a device display in following captured image when the edges are not visible in the following captured image, and indicate spoofing if future detected face is within the inferred boundary of the device.

FIG. 1 is a block diagram of an example of system 100 for facial spoofing detection in image based biometrics, according to an embodiment. In an example, the system 100 may include a computer system 105 with an image capture device with a field of view 110 arranged to capture a representation of a face of a user 115. The computer system 105 may include an environmental feature detector 120, a biometric feature detector 125, a synchronicity detector 130, and a spoofing indication controller 135. Any or all of the environmental feature detector 120, the biometric feature detector 125, the synchronicity detector 130, or the spoofing indication controller 135 may be implemented in whole or in part using circuit groups as defined below.

The computer system 105 may obtain a sequence of images, for example, from the image capture device or other source (e.g., a secondary device). The sequence of images may include a first plurality of images containing a representation of the user's face, and a second plurality of images in the sequence of images including a representation of an environment of the face. In this example, the environment of the face includes information other than the face (e.g., furniture, desktop items, devices, etc.) in an image of the sequence of images. In an example, the first plurality of images has different membership than the second plurality of images. That is, some images may appear in one set and not the other. For example, the first plurality of images may not include a member of the second plurality of images. In an example, however, the first plurality of images overlaps the second plurality of images in time, within the sequence of images. In an example, the member of the second plurality of images missing from the first plurality of images precedes in time the first plurality of images. In an example, the image capture component may first obtain a sequence of raw images (e.g., as received at a photosensor).

In an example, the image capture component may modify the sequence of raw images, or the image capture process, to produce the sequence of images to, for example, increase the ease of edge, face, or facial feature detection. In an example, the modification may include adjusting at least one of gain, exposure, or gamma. In an example, the modification may include applying a noise filter to the sequence of raw images.

The environmental feature detector 120 may be arranged to identify a feature of the environment of the face across the second plurality of images. In an example, the feature of the environment may include edges detected in the second plurality of images. In an example, the edges are restricted to moving edges (e.g., edges that are identifiable across obtained images that occupy a different location with respect to a coordinate system applied within images of the sequence of images. In an example, corners of moving edges (e.g., intersections of edges moving together) may be identified by the environmental feature detector 120. The environmental feature detector 120 may create a convex hull of these corners (e.g., a shape enclosing the smallest area that includes the corners). In an example, the environmental feature detector 120 may use, or contain, a catalog of known device edge configurations to determine whether the environmental feature represents a known device. In an example, a subset of the edges may be compared against display areas of known devices so as to discriminate between the device and its display. This may help to avoid false-positive spoofing attempt indications by eliminating, for example, facial feature detection in reflective, not generative (e.g., displays), device surfaces.

The biometric feature detector 125 may analyze the sequence of images and identify the representation of the user's face in the first plurality of images. In an example, the biometric feature detector 125 may create a marker for the representation of the face. The maker corresponds to a feature of the face—examples may include the eyes, nose, mouth, ears, or points defined by these features, such as a centroid of the eyes, a line that intersects the center of each eye, etc. In an example, changes in the marker between images in the first plurality of images may be indicative of changes in the movement of the representation of the face. That is, in this example, the marker is constructed in such a manner that it reflects underlying changes in facial orientation, a translation of the representation across the images, or other macro (e.g., whole face as opposed to micro movements such as a moving eye brow, upturned mouth, etc.) movement characteristics. In an example, the marker is a line between the centers of the eyes of the facial representation. In an example, the marker includes the center point of the line between the eyes. Other facial features may be used in a similar fashion, such as a line vertically bisecting the face, a triangle between the eyes and nose, the jawline, etc.

The synchronicity detector 130 may be arranged to quantify a correlation between the marker and the feature of the environment in the sequence of images to produce a synchronicity metric. The synchronicity metric is the degree to which the marker and the feature of the environment move together across the sequence of images. For example, the synchronicity detector 130 may compare a horizontal translation of the marker to that of a set of moving edges and note the degree to which the translations correlate. This degree of correlation is embodied in the created synchronicity metric. In an example, the synchronicity metric is a Boolean value to indicate whether or not there is synchronized movement. In an example, the synchronicity metric is a value that is compared to a threshold. Thus, if the value meets the threshold (e.g., is over or under the threshold) for synchronicity, then it may be determined that the marker and features are moving in a synchronized manner across the sequence of images. In an example, if the marker is not within the convex hull described above, the synchronicity metric is reduced. In an example, this reduction is specific so as to be below the threshold. In an example, if the marker is not within the display area of a known device, the synchronicity metric is reduced.

In an example, the synchronicity detector 130 may infer the position of either the marker of the features from previous data. For example, if a set of edges moving together indicate a device, but no face is yet found, the last known position of the device may be applied to following images in which the face is found but not the set of edges. This may account for sometimes low-quality video in which the edges or the face are not always detectable. Positioning techniques may be applied to enhance the confidence in the inferred device location. For example, a device detected at the edge of an image and moving may be determined to have moved out of the field of view 110 and thus omitted from future inferences until more data is received. Similarly, a device that is not detectable for some threshold period prior to a face being recognized may also be omitted from future inferences (e.g., because it may have been moved too quickly to register its motion out of the field of view 110).

The spoofing indication controller 135 may be arranged to accept the synchronicity metric and provide an indication as to whether a spoofing attempt has been made. In an example, the indication may include sending a message to an authentication component that a spoofing attempt has been made. In an example, the indication may include causing the authentication attempt to fail. In an example, the indication may include providing a notification to the user that a spoofing attempt was made, for example, at their work computer.

Figure 2:
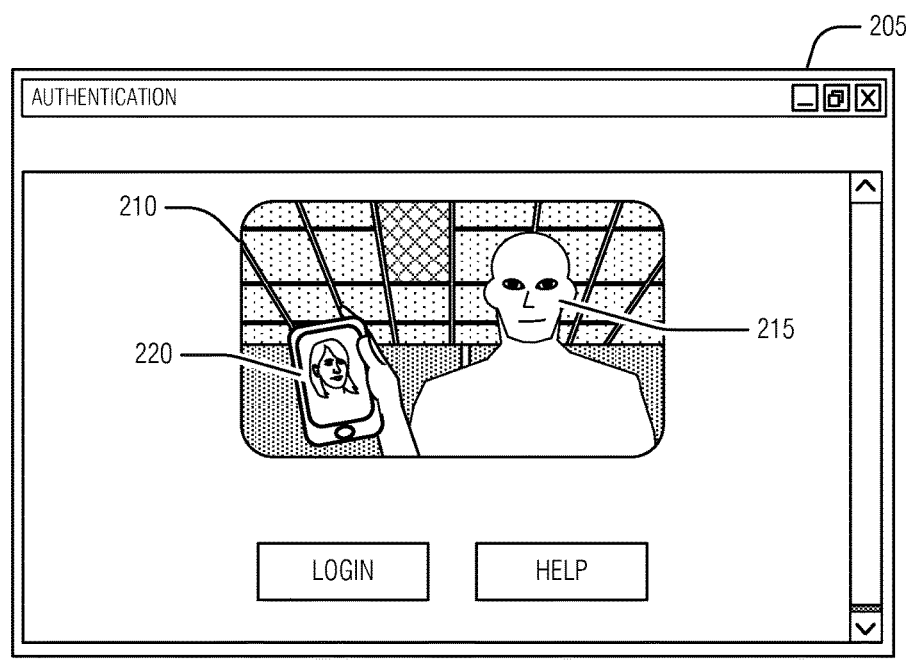
FIG. 2 illustrates an example of image capture interface for facial spoofing detection in image based biometrics, according to an embodiment.

FIG. 2 illustrates an example of image capture interface 200 for facial spoofing detection in image based biometrics, according to an embodiment. The interface 200 may include a dialog 205 user interface. The dialog 205 may include the sequence of images in a viewing port 210. As shown, the viewing port 210 includes an image in the sequence of images containing a representation of the user's face 215 as well as a device 220 with another representation of a face.

Figure 3:
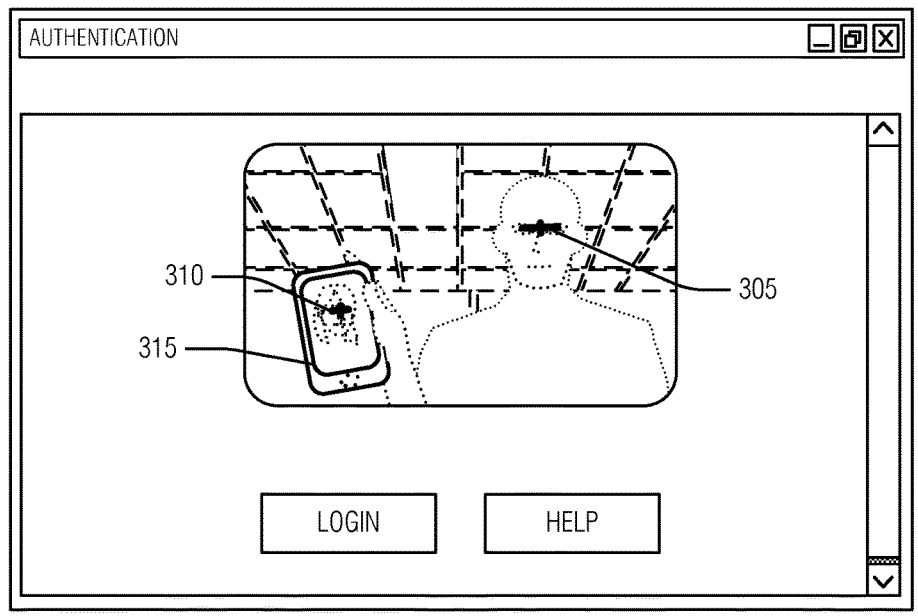
FIG. 3 illustrates an example of image analysis for facial spoofing detection in image based biometrics, according to an embodiment.

FIG. 3 illustrates an example of image analysis 300 for facial spoofing detection in image based biometrics, according to an embodiment. The image illustrated in FIG. 2 may be analyzed to discern relative motion of environmental features and the representations of the faces. As illustrated, dashed lines are non-moving edges, dotted lines are curved lines in the image, and solid lines are moving edges. The analysis 300 may detect the represented faces and create the marker 305 for the live face and the maker 310 for the spoofed face. Further, the analysis 300 may determine that the edges 315 are moving together and enclose an area. Thus, from the analysis 300, it may be determined that the marker 310 is within the moving edges 315, and thus such a face is a possible spoofing attempt that should be flagged or otherwise fail to authenticate the user. In contrast, the marker 305 is not within the edges 315 and so cannot be so easily assessed as a spoofing attempt. However, if the marker 305 moves synchronously to the moving edges 315, it may be determined that everything in the image is a facsimile of the user's environment—although in the illustrated example, this is unlikely because some of the edges are not moving relative to the moving edges 315.

The example illustrated in FIG. 3 includes both live and spoofed faces. It should be noted that the detection of a spoofed face alone will result in spoofing attempt indication. Further, when both live and other faces (e.g., pictures) are present, the discrimination between the two may limit the candidate faces for authentication by simply eliminating the other faces.

Figure 4:
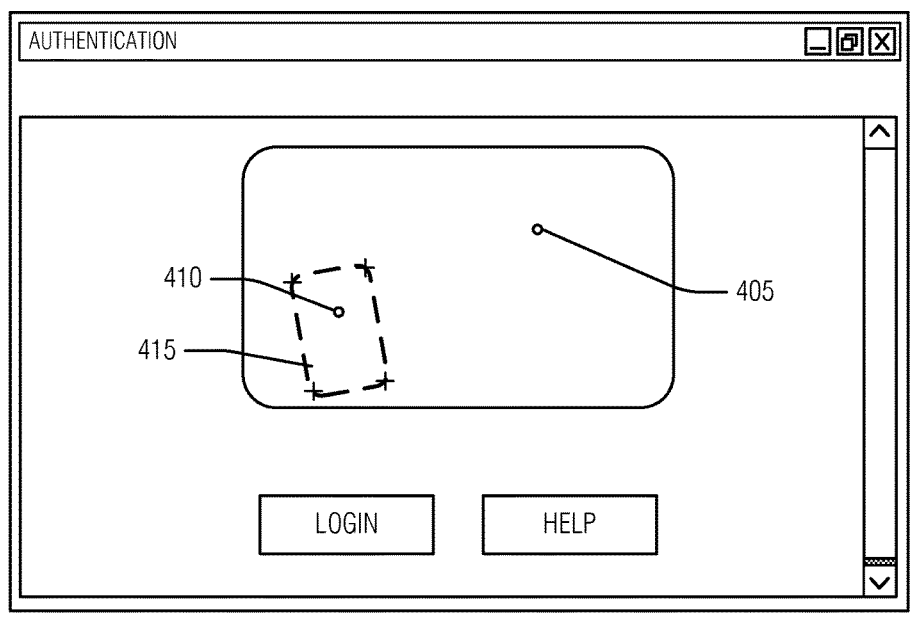
FIG. 4 illustrates an example of further image analysis for facial spoofing detection in image based biometrics, according to an embodiment.

FIG. 4 illustrates an example of further image analysis 400 for facial spoofing detection in image based biometrics, according to an embodiment. The moving edges of FIG. 3 may include more complexity than is necessary for performing the analysis (e.g., the display edges within the device edges as illustrated in FIG. 3). Further, it may be unnecessary to determine the orientation of the facial representation as long as the marker is determinable. The analysis 400 provides for these simplifications by creating a convex hull 415 based on a set of corners from the moving edges. As shown, the convex hull 415 encompasses an area including the device edges, the complexity of the display edges being obviated by the operation. Further, the marker (e.g., 305 or 310) may be changed to a secondary marker (e.g., one of secondary markers 405 or 410), in this example, a point at the mid-point of the eye line markers 305 and 310 of FIG. 3. Thus, the analysis 400 permits a straightforward determination as to whether a secondary marker (e.g., 405 or 410) is within a convex hull 415, as is the case with the secondary marker 410 and the convex hull 415, but is not the case with the secondary marker 405 and the convex hull 415. The analysis 400 allows for a concept of synchronization in which detecting a face within a moving device's confines is sufficient to ascertain synchronized movement between the face and the device. This approach has the advantage that a video playing on a device may include a facial representation that may not synchronize with the device's edges exactly (e.g., a four inch leftwards movement of the device edges and a one inch rightwards movement of the face), but is still determinable to be displayed by the device.

Figure 5:
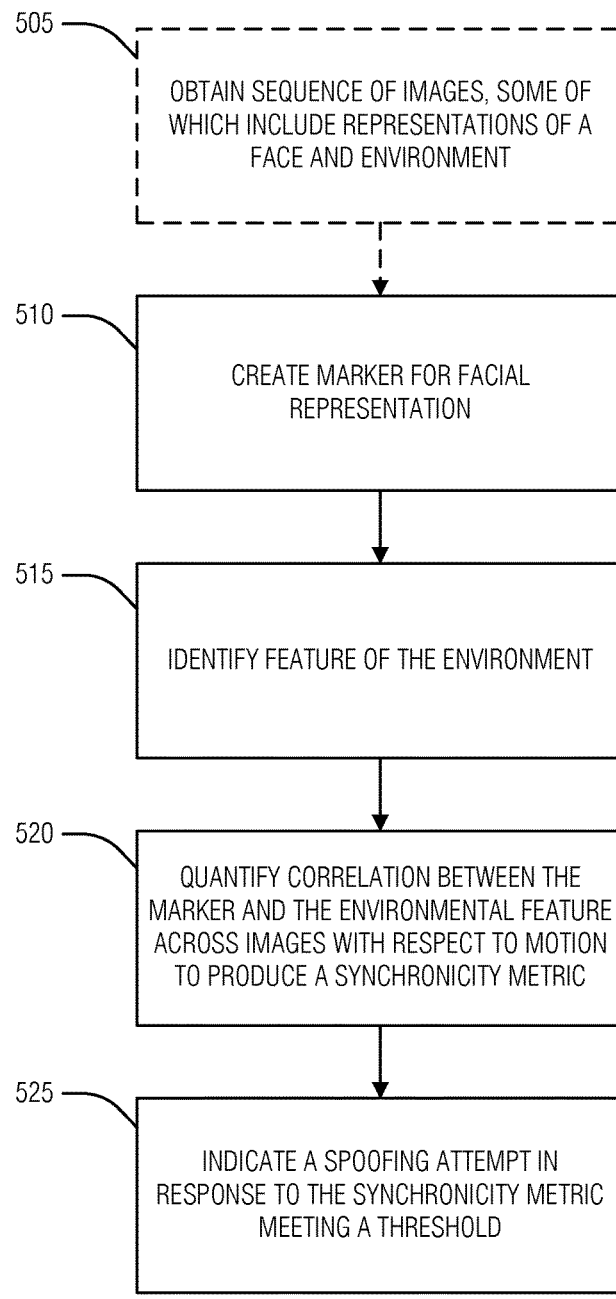
FIG. 5 illustrates a flow diagram of an example of a method for facial spoofing detection in image based biometrics, according to an embodiment.

FIG. 5 illustrates a flow diagram of an example of a method 500 for facial spoofing detection in image based biometrics, according to an embodiment. Operations of the method 500 may be performed by computer hardware, such as the components illustrated above with respect to FIG. 1, or with groups of circuits as described below with respect to FIG. 7.

At optional operation 505, a sequence of images from a camera may be obtained. In an example, a raw sequence of images may be obtained first. The raw sequence of images may be modified to create the sequence of images. In an example, the modification may include a change to at least one of gain, exposure, or gamma to enhance edge detection. In an example, the modification may include applying a noise filter to the sequence of raw images to produce the sequence of images. The sequence may include a first plurality of images including a representation of a face and a second plurality of images includes a representation of an environment of the face. In an example, the sequence of images may include at least thirty images.

At operation 510, a marker for the representation of the face may be created. The marker may correspond to a facial feature identifiable in the representation of the face. In an example, the marker may be selected such that changes in the marker between images in first plurality of images indicate changes in movements of the representation of the face. In an example, the marker includes a line drawn between the eyes of the facial representation.

At operation 515, an environmental feature of the environment of the face may be identified across the second plurality of images. In an example, the environmental feature includes a set of edges. In an example, the set of edges are moving edges. Thus, even if two edges are detected in the second plurality of images, if one of the edges is not moving then it will be excluded from the set of edges. In an example, the set of edges are moving together. Thus, given four moving edges detected in the second plurality of images, and only two are moving together (e.g., the same translation or rotation), then the set of edges will be limited to those two edges. Of course, an additional set of edges may be constructed from the other detected edges and separately analyzed as this set of edges are. In an example, the feature identification may include a convex hull of a set of corners for the set of edges. In this example, edge corners are intersections of the edges in the set of edges. In an example, the set of edges are matched to a known device via a catalog of edge configurations for known devices. In an example, a subset of the set of edges is matched to a display area of a known device.

At operation 520, a correlation between the marker and the environmental feature may be quantified with respect to motion across the sequence of images to produce a synchronicity metric. In an example, where the marker is outside the convex hull, the synchronicity metric is reduced. In an example, the first plurality of images does not include a member of the second plurality of images, the missing member precedes in time the first plurality of images and includes a determined resting spot for the moving edges that outlining an area, and the marker is within the area for an image in which the moving edges are not detected following the member, the marker is determined to be within the convex hull for the synchronicity metric. Thus, the device position is inferred from prior data and the face is determined to originate from the device even though the device (or its edges) is not detectable in the specific image in which the facial representation was found. In an example, the marker is sought within a display area of a known device, increasing the synchronicity metric if found there, and decreasing the synchronicity metric otherwise. Thus, the method 500 may discriminate between an image displayed by the device and possibly an image reflected by a case, bezel, or other non-display portion of the device.

At operation 525, a spoofing attempt may be indicated in response to the synchronicity metric meeting a threshold. In an example, indicating the spoofing attempt may include causing an authentication attempt to fail. In an example, indicating the spoofing attempt may include notifying an authentication component of the spoofing attempt. In an example, the notification may include a confidence measure. For example, given the example above of the marker being detected within inferred moving edges, a percentage certainty of the spoofing attempt may be communicated, for example, based on the number of images between when the edges where last noted and the appearance of the marker in the same space.

Figure 6:
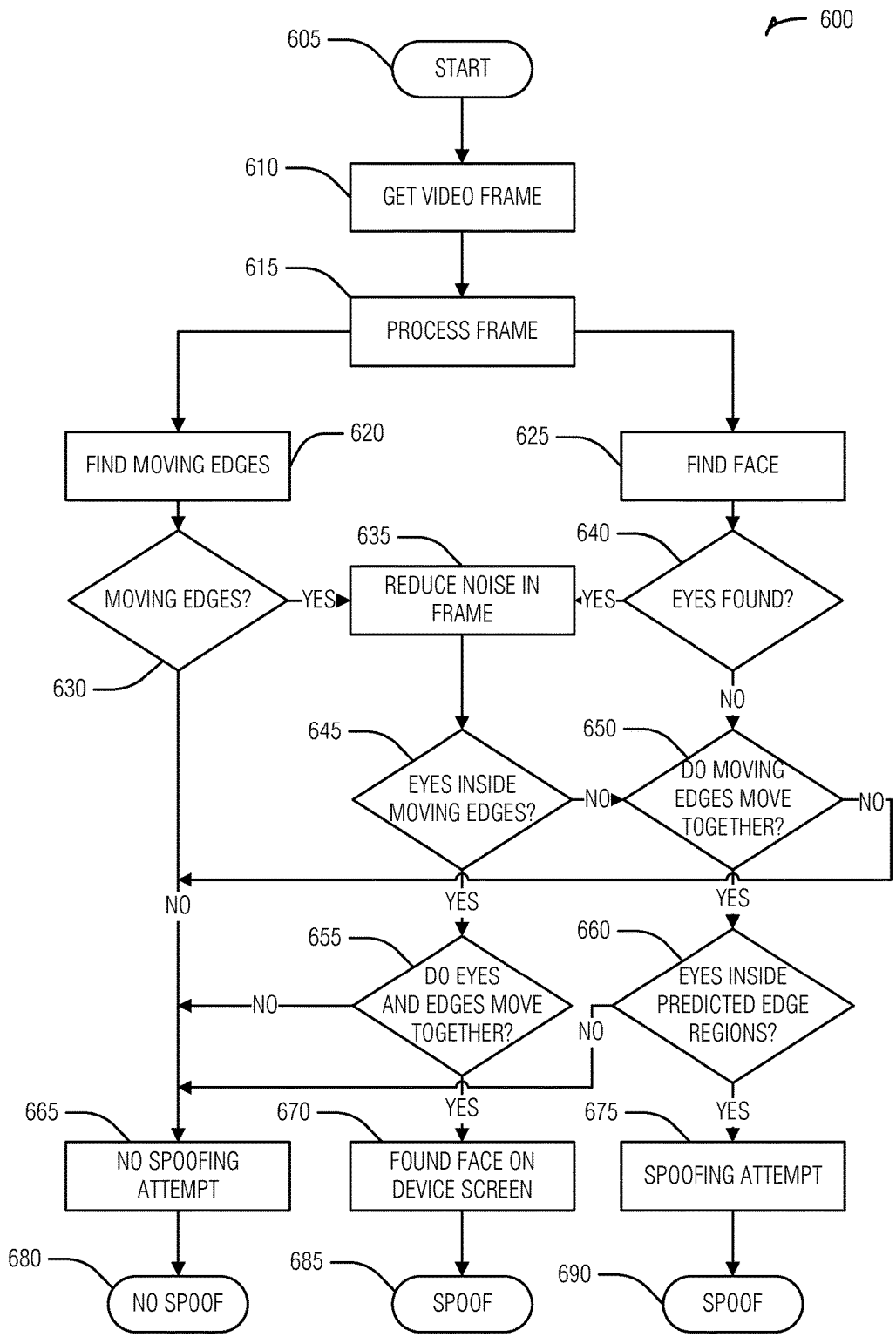
FIG. 6 illustrates a flow diagram of an example of a method for facial spoofing detection in image based biometrics, according to an embodiment.

FIG. 6 illustrates a flow diagram of an example of a method 600 for facial spoofing detection in image based biometrics, according to an embodiment.

At operation 605, the method 600 begins. In an example, the method 600 is invoked by a face-based authentication process to authenticate a user using the user's face. Sequenced image data (e.g., a video) may be acquired (e.g., received, retrieved, etc.) at operation 605.

At operation 610, a video frame is obtained. The video frame is an image in the sequenced image data.

At operation 615, the video frame is processed. Processing may include such operations as adjusting the brightness, contrast, colors, etc. of the video frame.

At operation 620, edge detection is performed to find edges and edge characteristics in the video frame. Whether an edge is moving is an example edge characteristic, along with length, orientation, etc.

At operation 630, a determination as to whether moving edges exist within the video frame is made using the edge characteristics of operation 620. If there are moving edges, the method 600 proceeds to operation 635. If there are not moving edges, the method 600 proceeds to operation 665.

At operation 625, facial detection analysis is performed on the video frame. The facial detection analysis may include identifying one or more faces in the video frame. In an example, facial features for the one or more faces are also identified via the facial analysis. Facial feature may include eyes, nose, mouth, scars, coloring, hair coverage, etc.

At operation 640, a determination as to whether eyes were found in the facial analysis of operation 625 is made. If yes, the method 600 proceeds to operation 635. If no, the method proceeds to operation 650.

At operation 635, further processing operations on the video frame may be performed. Such operations may include noise reduction. Noise reduction may include converting the video frame to an alternative representation in which relevant data is retained and irrelevant data is omitted. Such an example is described above with respect to both of FIGS. 3 and 4.

At operation 645, a determination is made as to whether eyes are inside moving edges (e.g., an area fully or partially enclosed by the moving edges). If yes, the method 600 proceeds to operation 655. If no, the method 600 proceeds to operation 650.

At operation 650, a determination is made as to whether at least some edges detected in the video frame (e.g., such as by the analysis at operation 620) are moving together. In an example, edges moving together may be grouped to indicate a device. In an example, the moving edges are compared to known device configurations to ascertain whether a group of edges represent a device. If at least some of the edges are moving together, the method 600 proceeds to operation 660. If at least some of the edges are not moving together, then the method 600 proceeds to operation 665.

At operation 655, a determination is made as to whether the eyes within moving edges (detected in operation 645) are moving together with those edges. If the determination is positive, the method 600 proceeds to operation 670. If the determination is negative, the method 600 proceeds to operation 665. While operation 655 helps to ascertain whether a static image is bounded within the edges, in an example, however, this operation may be ignored (e.g., operation 655 is optional) and pass through to operation 670. By ignoring operation 655, the method 600 may possibly identify a video being displayed on the device in a spoofing attempt with the possible cost of increased false positive spoofing attempt determinations.

At operation 660, a determination is made as to whether eyes in a following (e.g., later) video frame appear within predicted edge regions determined from operation 650. That is, edges moving together in operation 650 may be inferred in following video frames in which the moving edges are not moving or even detected. Similar inferences may be made about the eyes, or other facial features. Such inferences address image capturing, edge detection, or facial detection difficulties in which eyes and moving edges that are in fact moving together, are not detected as moving together. If the determination is positive, the method 600 proceeds to operation 675. If the determination is negative, the method 600 proceeds to operation 665.

At operation 665, a determination of no spoofing attempt is declared. Operation 665 may provide additional processing, such as timing or synchronizing operations to ensure enough time has elapsed for previous operations, an entry point for additional authentication related operations, etc. Operation 665 prepares an indication that no spoofing attempt was made. In an example, the indication is prepared for one or more authentication components used to ultimately authenticate the user.

At operation 670, an indication that a face was found on a device screen is created. Such an indication may include logging, preparing a spoof attempt indication, or notifying other authentication components.

At operation 675, an indication that spoofing attempt was made is created. Such an indication may include logging, preparing a spoof attempt indication, or notifying other authentication components.

At operation 680, the method 600 ends indicating that no spoof attempt was made.

At operations 685 and 690, the method 600 ends indicating that a spoof attempt was made.

Figure 7:
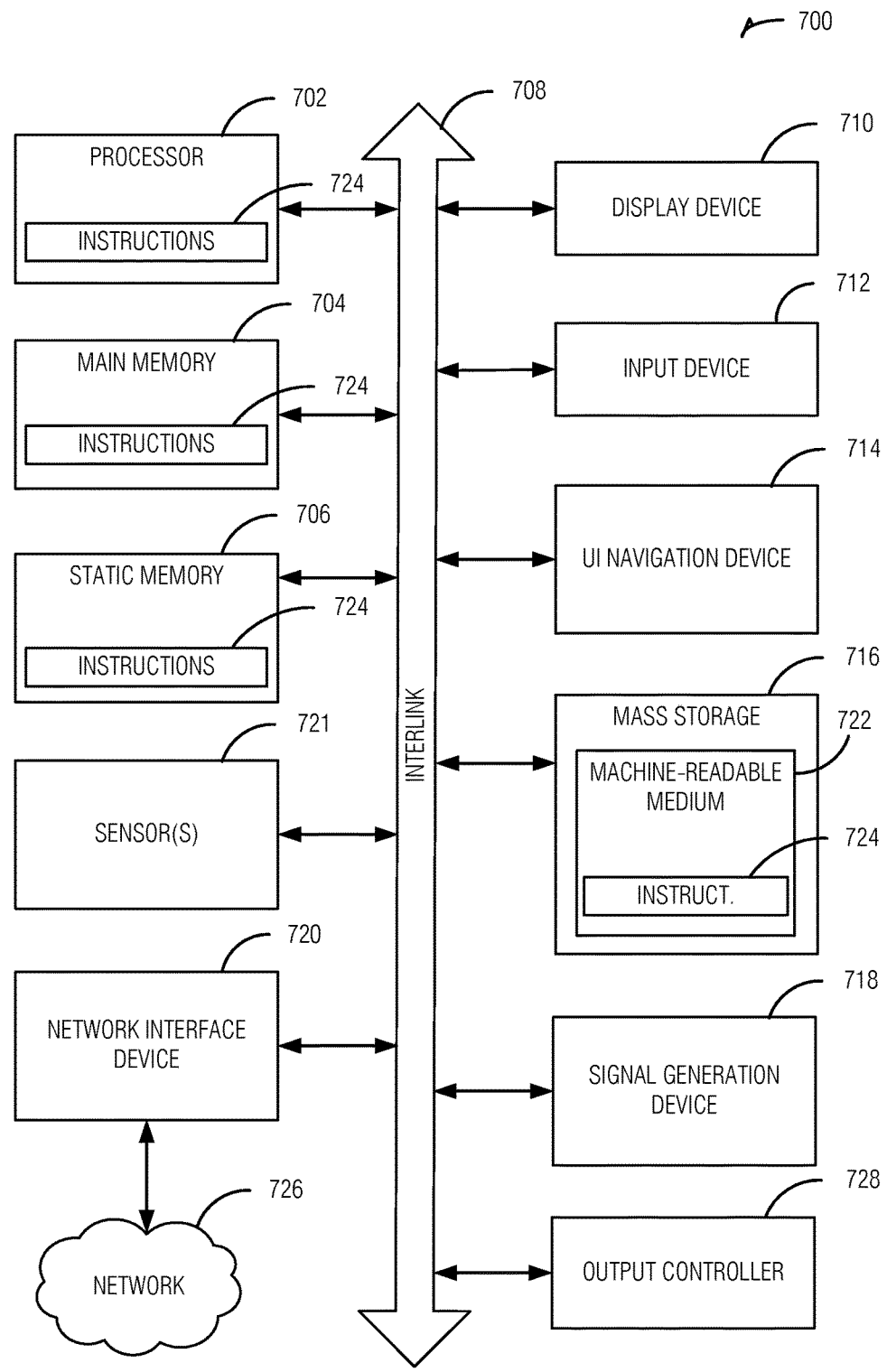
FIG. 7 is a block diagram illustrating an example of a machine upon which one or more embodiments may be implemented.

FIG. 7 illustrates a block diagram of an example machine 700 upon which any one or more of the techniques (e.g., methodologies) discussed herein may perform. In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets (also known as a group of circuits or circuit groups) are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a display unit 710, an alphanumeric input device 712 (e.g., a keyboard), and a user interface (UI) navigation device 714 (e.g., a mouse). In an example, the display unit 710, input device 712 and UI navigation device 714 may be a touch screen display. The machine 700 may additionally include a storage device (e.g., drive unit) 716, a signal generation device 718 (e.g., a speaker), a network interface device 720, and one or more sensors 721, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 716 may constitute machine readable media.

While the machine readable medium 722 is illustrated as a single medium, the term "machine readable medium" may include a single medium or multiple media (e.g., a centralized or distributed database, and/or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software.

ADDITIONAL NOTES & EXAMPLES

Example 1 includes subject matter (such as a method, means for performing acts, machine readable medium including instructions that when performed by a machine cause the machine to performs acts, or an apparatus to perform) comprising: a biometric feature detector to create a marker for a representation of a face in a first plurality of images of a sequence of images, the marker corresponding to a facial feature; an environmental feature detector to identify an environmental feature of an environment of the face across a second plurality of images of the sequence of images; a synchronicity detector to quantify a correlation between the marker and the environmental feature in the sequence of images to produce a synchronicity metric; and a spoofing indication controller to indicate a spoofing attempt in response to the synchronicity metric meeting a threshold.

In Example 2, the subject matter of Example 1 may include, wherein the marker is a line between eyes in the representation of the face.

In Example 3, the subject matter of any one of Examples 1 to 2 may include, wherein the environmental feature includes edges detected in the second plurality of images.

In Example 4, the subject matter of any one of Examples 1 to 3 may include, wherein the edges are moving edges.

In Example 5, the subject matter of any one of Examples 1 to 4 may include, wherein the edges define a convex hull.

In Example 6, the subject matter of any one of Examples 1 to 5 may include, wherein the convex hull does not include the marker resulting in the synchronicity metric being reduced.

In Example 7, the subject matter of any one of Examples 1 to 6 may include, wherein the environmental feature detector is to compare the edges to a catalog of device edge configurations to determine whether the edges represent a known device.

In Example 8, the subject matter of any one of Examples 1 to 7 may include, wherein the edges correspond to a known device, and wherein a subset of edges correspond to a display area of the known device.

In Example 9, the subject matter of any one of Examples 1 to 8 may include, wherein the display area does not include the marker resulting in the synchronicity metric being reduced.

In Example 10, the subject matter of any one of Examples 1 to 9 may include, wherein the first plurality of images does not include a member of the second plurality of images, wherein the member precedes in time the first plurality of images and includes a determined resting spot for the moving edges, the moving edges outlining an area, and wherein the marker is within area for an image in which the moving edges are not detected following the member, the marker is determined to be within the convex hull for the synchronicity metric.

In Example 11, the subject matter of any one of Examples 1 to 10 may include an image capture component to: obtain a sequence of raw images from a camera; and modify the sequence of raw images to produce the sequence of images, the modifying including changing at least one of gain, exposure, or gamma to enhance edge detection.

In Example 12, the subject matter of any one of Examples 1 to 11 may include, wherein to modify the sequence of raw images includes the image capture component to apply a noise filter to the sequence of raw images to produce the sequence of images.

In Example 13, the subject matter of any one of Examples 1 to 12 may include, wherein the sequence of frames is at least thirty frames.

Example 14 includes subject matter (such as a method, means for performing acts, machine readable medium including instructions that when performed by a machine cause the machine to performs acts, or an apparatus to perform) comprising: creating, using a first group of circuits, a marker for a representation of a face in a first plurality of images of a sequence of images, the marker corresponding to a facial feature; identifying an environmental feature of an environment of the face across a second plurality of images of the sequence of images using a second group of circuits; quantifying, using a third group of circuits, a correlation between the marker and the environmental feature in the sequence of images to produce a synchronicity metric; and indicating, using a fourth group of circuits, a spoofing attempt in response to the synchronicity metric meeting a threshold.

In Example 15, the subject matter of Example 14 may include, wherein the marker is a line between eyes in the representation of the face. In Example 16, the subject matter of any one of Examples 14 to 15 may include, wherein the environmental feature includes edges detected in the second plurality of images.

In Example 17, the subject matter of any one of Examples 14 to 16 may include, wherein the edges are moving edges.

In Example 18, the subject matter of any one of Examples 14 to 17 may include, wherein the edges define a convex hull.

In Example 19, the subject matter of any one of Examples 14 to 18 may include, wherein the convex hull does not include the marker resulting in the synchronicity metric being reduced.

In Example 20, the subject matter of any one of Examples 14 to 19 may include, wherein the edges are compared to a catalog of device edge configurations to determine whether the edges represent a known device.

In Example 21, the subject matter of any one of Examples 14 to 20 may include, wherein the edges correspond to a known device, and wherein a subset of edges correspond to a display area of the known device.

In Example 22, the subject matter of any one of Examples 14 to 21 may include, wherein the display area does not include the marker resulting in the synchronicity metric being reduced.

In Example 23, the subject matter of any one of Examples 14 to 22 may include, wherein the first plurality of images does not include a member of the second plurality of images, wherein the member precedes in time the first plurality of images and includes a determined resting spot for the moving edges, the moving edges outlining an area, and wherein the marker is within area for an image in which the moving edges are not detected following the member, the marker is determined to be within the convex hull for the synchronicity metric.

In Example 24, the subject matter of any one of Examples 14 to 23 may include: obtaining a sequence of raw images from a camera; and modifying the sequence of raw images to produce the sequence of images, the modifying including changing at least one of gain, exposure, or gamma to enhance edge detection.

In Example 25, the subject matter of any one of Examples 14 to 24 may include, wherein the modifying includes applying a noise filter to the sequence of raw images to produce the sequence of images.

In Example 26, the subject matter of any one of Examples 14 to 25 may include, wherein the sequence of frames is at least thirty frames.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for facial spoofing detection in image based biometrics, the method comprising:
    a biometric feature detector to create a marker for a representation of a face in a first plurality of images of a sequence of images, the marker corresponding to a facial feature;
    an environmental feature detector to identify an environmental feature of an environment of the face across a second plurality of images of the sequence of images, wherein the environmental feature includes edges detected in the second plurality of images, wherein the edges are moving edges, and wherein the edges define a convex hull;
    a synchronicity detector to quantify a correlation between the marker and the environmental feature in the sequence of images to produce a synchronicity metric, wherein the convex hull does not include the marker resulting in the synchronicity metric being reduced; and
    a spoofing indication controller to indicate a spoofing attempt in response to the synchronicity metric meeting a threshold.

2. The system of claim 1, wherein the marker is a line between eyes in the representation of the face.

3. The system of claim 1, wherein the first plurality of images does not include a member of the second plurality of images, wherein the member precedes in time the first plurality of images and includes a determined resting spot for the moving edges, the moving edges outlining an area, and wherein the marker is within the area for an image in which the moving edges are not detected following the member, the marker is determined to be within the convex hull for the synchronicity metric.

4. The system of claim 1, wherein the environmental feature detector is to compare the edges to a catalog of device edge configurations to determine whether the edges represent a known device.

5. The system of claim 4, wherein the edges correspond to a known device, and wherein a subset of edges correspond to a display area of the known device, and wherein the display area does not include the marker resulting in the synchronicity metric being reduced.

6. A method for facial spoofing detection in image based biometrics, the method comprising:
creating, using a first group of circuits, a marker for a representation of a face in a first plurality of images of a sequence of images, the marker corresponding to a facial feature;
identifying an environmental feature of an environment of the face across a second plurality of images of the sequence of images using a second group of circuits, wherein the environmental feature includes edges detected in the second plurality of images, wherein the edges are moving edges, and wherein the edges define a convex hull;
quantifying, using a third group of circuits, a correlation between the marker and the environmental feature in the sequence of images to produce a synchronicity metric, wherein the convex hull does not include the marker resulting in the synchronicity metric being reduced; and
indicating, using a fourth group of circuits, a spoofing attempt in response to the synchronicity metric meeting a threshold.

7. The method of claim 6, wherein the marker is a line between eyes in the representation of the face.

8. The method of claim 6, wherein the first plurality of images does not include a member of the second plurality of images, wherein the member precedes in time the first plurality of images and includes a determined resting spot for the moving edges, the moving edges outlining an area, and wherein the marker is within area for an image in which the moving edges are not detected following the member, the marker is determined to be within the convex hull for the synchronicity metric.

9. The method of claim 6, wherein the edges are compared to a catalog of device edge configurations to determine whether the edges represent a known device.

10. The method of claim 9, wherein the edges correspond to a known device, and wherein a subset of edges correspond to a display area of the known device, and wherein the display area does not include the marker resulting in the synchronicity metric being reduced.

11. At least one machine readable medium that is not a transitory propagating signal, the at least one machine readable medium including instructions that, when executed by a machine, cause the machine to perform operations:
creating, using a first group of circuits, a marker for a representation of a face in a first plurality of images of a sequence of images, the marker corresponding to a facial feature;
identifying an environmental feature of an environment of the face across a second plurality of images of the sequence of images using a second group of circuits, wherein the environmental feature includes edges detected in the second plurality of images, wherein the edges are moving edges, and wherein the edges define a convex hull;
quantifying, using a third group of circuits, a correlation between the marker and the environmental feature in the sequence of images to produce a synchronicity metric, wherein the convex hull does not include the marker resulting in the synchronicity metric being reduced; and
indicating, using a fourth group of circuits, a spoofing attempt in response to the synchronicity metric meeting a threshold.

12. The at least one machine readable medium of claim 11, wherein the marker is a line between eyes in the representation of the face.

13. The at least one machine readable medium of claim 11, wherein the first plurality of images does not include a member of the second plurality of images, wherein the member precedes in time the first plurality of images and includes a determined resting spot for the moving edges, the moving edges outlining an area, and wherein the marker is within area for an image in which the moving edges are not detected following the member, the marker is determined to be within the convex hull for the synchronicity metric.

14. The at least one machine readable medium of claim 11, wherein the edges are compared to a catalog of device edge configurations to determine whether the edges represent a known device.

15. The at least one machine readable medium of claim 14, wherein the edges correspond to a known device, and wherein a subset of edges correspond to a display area of the known device, and wherein the display area does not include the marker resulting in the synchronicity metric being reduced.

16. The system of claim 1, comprising an image capture component to:
obtain a sequence of raw images from a camera; and
modify the sequence of raw images to produce the sequence of images, the modifying including changing at least one of gain, exposure, or gamma to enhance edge detection.

17. The system of claim 16, wherein to modify the sequence of raw images includes the image capture component to apply a noise filter to the sequence of raw images to produce the sequence of images.

18. The system of claim 1, wherein the sequence of images is at least thirty images.

19. The method of claim 6, comprising:
obtaining a sequence of raw images from a camera; and
modifying the sequence of raw images to produce the sequence of images, the modifying including changing at least one of gain, exposure, or gamma to enhance edge detection.

20. The method of claim 19, wherein modifying the sequence of raw images includes applying a noise filter to the sequence of raw images to produce the sequence of images.

21. The method of claim 6, wherein the sequence of images is at least thirty images.

22. The at least one machine readable medium of claim 11, wherein the operations comprise:
obtaining a sequence of raw images from a camera; and
modifying the sequence of raw images to produce the sequence of images, the modifying including changing at least one of gain, exposure, or gamma to enhance edge detection.

23. The at least one machine readable medium of claim 22, wherein modifying the sequence of raw images includes the image capture component to apply a noise filter to the sequence of raw images to produce the sequence of images.

24. The at least one machine readable medium of claim 11, wherein the sequence of images is at least thirty images.

* * * * *